United States Patent
Fong

(10) Patent No.: US 10,221,954 B2
(45) Date of Patent: Mar. 5, 2019

(54) CHECK VALVE WITH PLASTIC LIP SEAL

(71) Applicant: FLOW CONTROL LLC, Beverly, MA (US)

(72) Inventor: John J. Fong, Irvine, CA (US)

(73) Assignee: Flow Control LLC, Beverly, MA (US)

(*) Notice: Subject to any disclaimer, the term of this patent is extended or adjusted under 35 U.S.C. 154(b) by 0 days.

(21) Appl. No.: 15/638,675

(22) Filed: Jun. 30, 2017

(65) Prior Publication Data

US 2018/0128389 A1    May 10, 2018

Related U.S. Application Data

(63) Continuation of application No. 12/112,448, filed on Apr. 30, 2008, now abandoned.

(51) Int. Cl.
*F16K 15/06* (2006.01)
*F04B 53/10* (2006.01)

(52) U.S. Cl.
CPC ........ *F16K 15/063* (2013.01); *F04B 53/1032* (2013.01); *F05C 2225/00* (2013.01); *Y10T 137/7837* (2015.04)

(58) Field of Classification Search
CPC ............... F16K 15/063; F04B 53/1032; Y10T 137/7837; F05C 2225/00
USPC .............. 417/307; 137/511, 514, 515, 522, 137/543.23, 843, 844, 845, 846, 223, 137/516.15, 516.25, 516.26, 516.27, 137/516.29, 540, 541, 542, 543, 543.13; 251/120, 323
See application file for complete search history.

(56) References Cited

U.S. PATENT DOCUMENTS

| | | | | |
|---|---|---|---|---|
| 1,581,778 A | * | 4/1926 | Blomgren | F16K 1/36 123/188.8 |
| 3,626,977 A | * | 12/1971 | Riley | F16K 15/028 137/516.25 |
| 3,701,361 A | * | 10/1972 | Bunn | F16K 1/34 137/543.23 |
| 3,770,001 A | * | 11/1973 | Davis | F16K 15/04 137/202 |
| 4,408,632 A | * | 10/1983 | Kent | F16K 15/063 137/516.29 |
| 7,708,025 B2 | * | 5/2010 | Johnson | F16K 15/063 137/316 |

(Continued)

*Primary Examiner* — Charles G Freay
(74) *Attorney, Agent, or Firm* — Ware, Fressola, Maguire, Barber LLP

(57) ABSTRACT

A check valve is provided having a seat and a poppet. The seat is made of a plastic material, has an aperture for enabling fluid to flow through the seat, and also has one end portion that has a circumferential edge with a thin sealing lip. The poppet is slidably arranged in the aperture of the seat and has an elastic member. The poppet is configured for opening to enable fluid to flow in one direction when fluid pressure is detected. The elastic member is configured for ensuring sealing between an outer surface of the poppet and the thin sealing lip of the seat when there is no fluid flow in the one direction so as to substantially prevent fluid flow in the opposite direction. According to some embodiments of the present invention, the thin plastic sealing lip may have a thickness of about 0.01" Embodiments are also envisioned where the thickness may be in a range of 0.003"-0.03".

2 Claims, 3 Drawing Sheets

SECTION A-A

(56) References Cited

U.S. PATENT DOCUMENTS

2005/0263187 A1* 12/2005 Jernigan ............... F16K 15/026
137/454.2

* cited by examiner

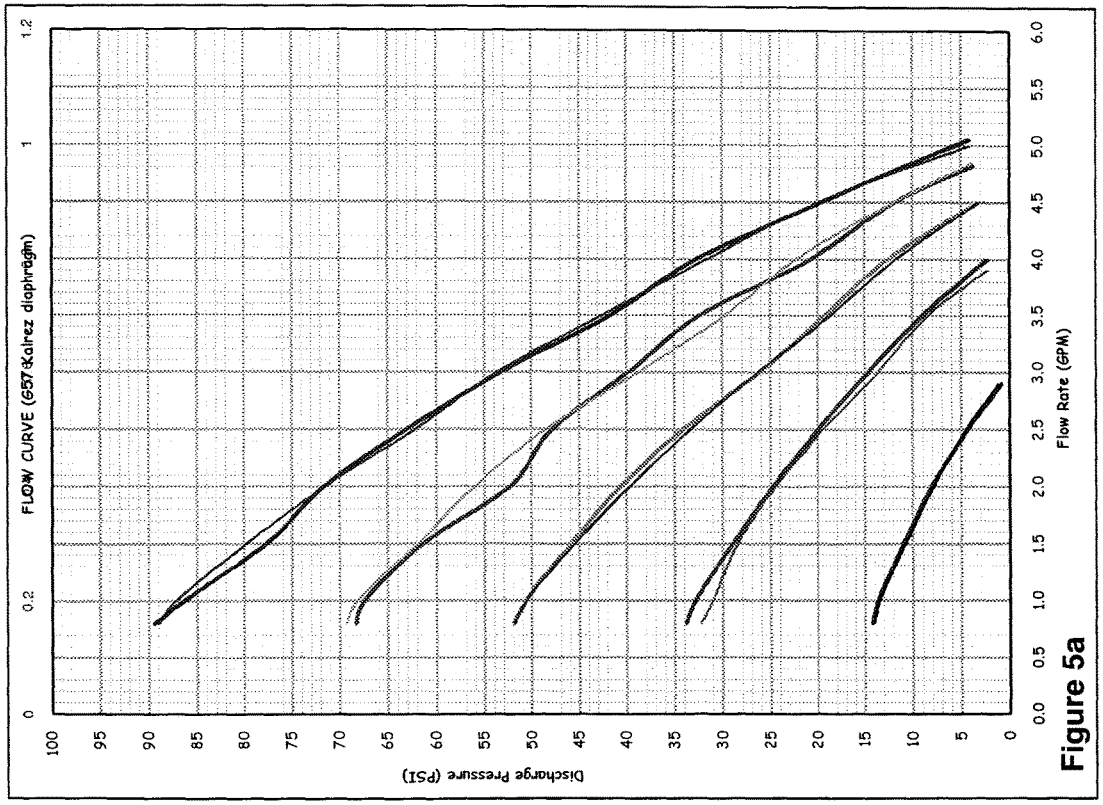

CHECK VALVE WITH PLASTIC LIP SEAL

BACKGROUND OF THE INVENTION

1. Field of Invention

This invention relates to a check valve; and more particularly to a check valve for a pump or other suitable device.

2. Description of Related Art

The assignee of the instant patent application is currently developing a pump that requires a high chemical resistance. The pump may be used to process chemicals like hydrocarbon solvents or ethylene glycol monobutyl ether, or the like. Typical parts for such a pump may include a diaphragm, check valves, etc., which must be resistant to corroding from the chemicals. The parts can be made out of perfluoroelastomer which has a high chemical resistance; however, perfluoroelastomer is an expensive material.

While a high cost material, such as perfluoroelastomer, may be used for the diaphragm of the pump, the pump is designed to include four (4) check valves, and the overall cost of the pump is directly impacted by the cost of making these check valves. For example, the assignee of the instant patent application has made check valves using perfluoroelastomer. Currently, the cost of the check valve using perfluoroelastomer is about $5.00 per check valve. In view of this, the price for the perfluoroelastomer is too expensive to make check valve out of this type of elastomer, so there is a need to find a less expensive, yet effective, alternative.

SUMMARY OF THE INVENTION

The present invention provides a new and unique check valve having a seat and a poppet. The seat is made of a plastic material, has an aperture for enabling fluid to flow through the seat, and also has one end portion that has a circumferential edge with a thin sealing lip. The poppet is slidably arranged in the aperture of the seat and has an elastic member. The poppet is configured for opening to enable fluid to flow in one direction when fluid pressure is detected. The elastic member is configured for ensuring sealing between an outer circumferential surface of the poppet and the thin sealing lip of the seat when there is no fluid flow in the one direction so as to substantially prevent fluid flow in the opposite direction.

According to some embodiments of the present invention, the thin plastic sealing lip may have a thickness of about 0.01". Testing data supports the operability of this thickness. Embodiments are also envisioned where the thickness may be in a range of 0.003"-0.03". The use of plastic material allows for these tolerance re thickness of the thin sealing lip.

The assignee of the instant patent application has made check valves using perfluoroelastomer, which is a much more expensive material. By way of example, the cost of the check valve using perfluoroelastomer is about $5.00 per valve, while the cost of the check using plastic is about $0.20, which results in a cost savings of about $4.80/check valve. The check valves according to the present invention forms part of a pump being made by the assignee of the instant patent application that typically includes four (4) such check valves. Since the overall cost of the pump being made using the check valve according to the present invention is about $20-25, the total cost saving resulting from the using the check valves using plastic according to the present invention has a substantial impact of the cost savings associated with the overall pump.

Other features of the present invention may include: the plastic material being polypropylene; the thin sealing lip of the seat for coupling in a sealing manner with a circumferential curved outer surface of the poppet; the elastic member being a spring; the poppet having a cavity for receiving the elastic member; the elastic member being configured between the seat and the poppet for urging the poppet when no fluid flows in the one direction; and the check valve having one or more O-rings arranged on the outer surface of the seat for sealing the seat in relation to another body or device to prevent fluid from leaking.

In effect, the check valve according to the present invention is design to use minimum perfluoroelastomer or use lower grade elastomer on the static sealing surface. The design uses thin lip on the dynamic sealing surface to make plastic material more flexible for sealing purpose.

The invention may also take the form of a pump having one or more check valves described herein.

BRIEF DESCRIPTION OF THE DRAWING

FIG. 5a shows a graph of test data for a $1^{st}$ unit and a $2^{nd}$ unit having flow rate (GPM) versus discharge pressure (PSI).

FIG. 5b shows the test data for the $1^{st}$ unit shown in the graph in FIG. 5a.

FIG. 5c shows the test data for the $2^{nd}$ unit shown in the graph in FIG. 5a.

DESCRIPTION OF THE INVENTION

Figure 1:
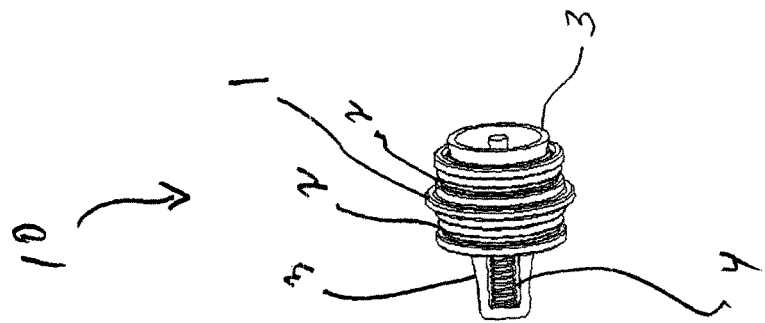
FIG. 1 shows a side view of a check valve according to some embodiments of the present invention.
Figure 3:
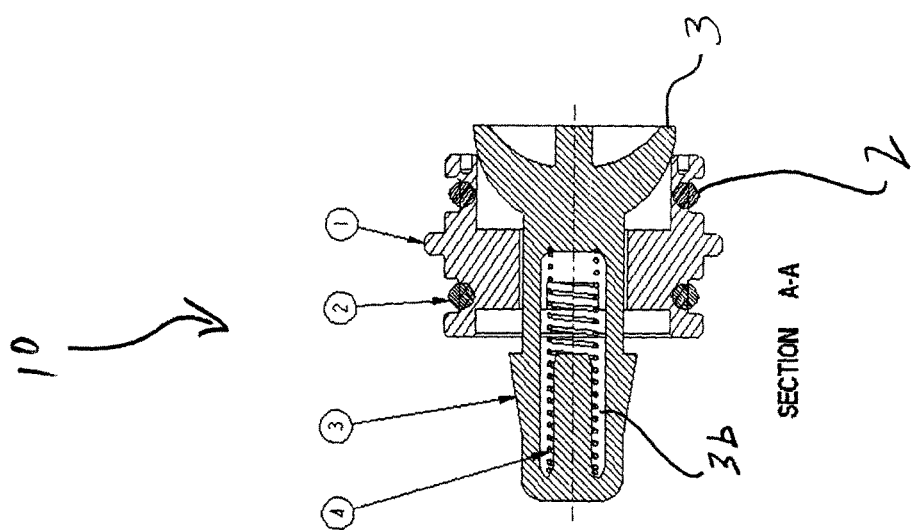
FIG. 3 is a cross-sectional view of the check valve in FIG. 1 along the lines A-A shown in FIG. 2.
Figure 2:
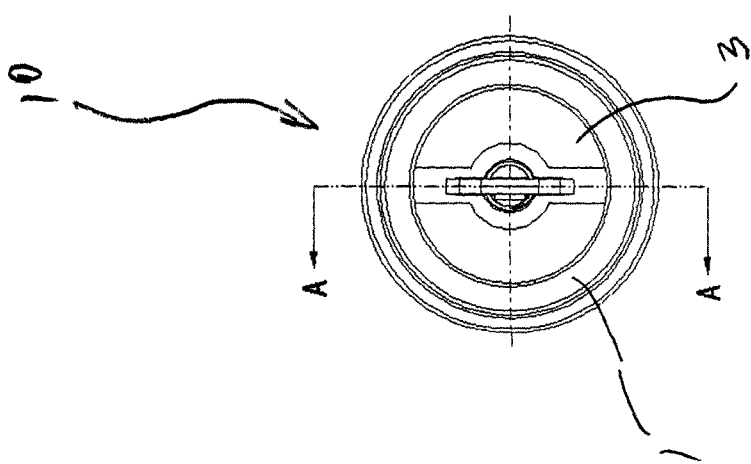
FIG. 2 shows a front view of the check valve in FIG. 1.

FIGS. 1-3 show a check valve generally indicated as 10 according to some embodiments of the present invention. The check valve 10 includes a seat 1, one or more O-rings 2, a poppet 3 and an elastic member 4 such as a return spring. The seat 1 is made of a plastic material, has an aperture 11 (FIG. 4) for enabling fluid to flow through the seat 1, and also has one end portion that has a circumferential edge 1a with a thin sealing lip generally indicated as 5. The poppet 3 is slidably arranged in the aperture 11 of the seat 1 and has the return spring 4. The poppet 3 is configured for opening to enable fluid to flow in one direction when fluid pressure is detected. The return spring 4 is configured for ensuring sealing between the poppet 3 and the thin sealing lip 5 of the seat 1 when there is no fluid flow in the one direction so as to substantially prevent fluid flow in the opposite direction. The poppet 3 opens to enable fluid to flow in one direction when pressure is biased in one direction. The return spring 4 ensures the sealing between an outer circumferential surface 3a of the poppet 3 and the circumferential edge 1a of the seat 1 when there is no flow. The o-rings 2 seals the body and the endcap from leaking fluid to exterior of the pump (not shown).

Figure 4:
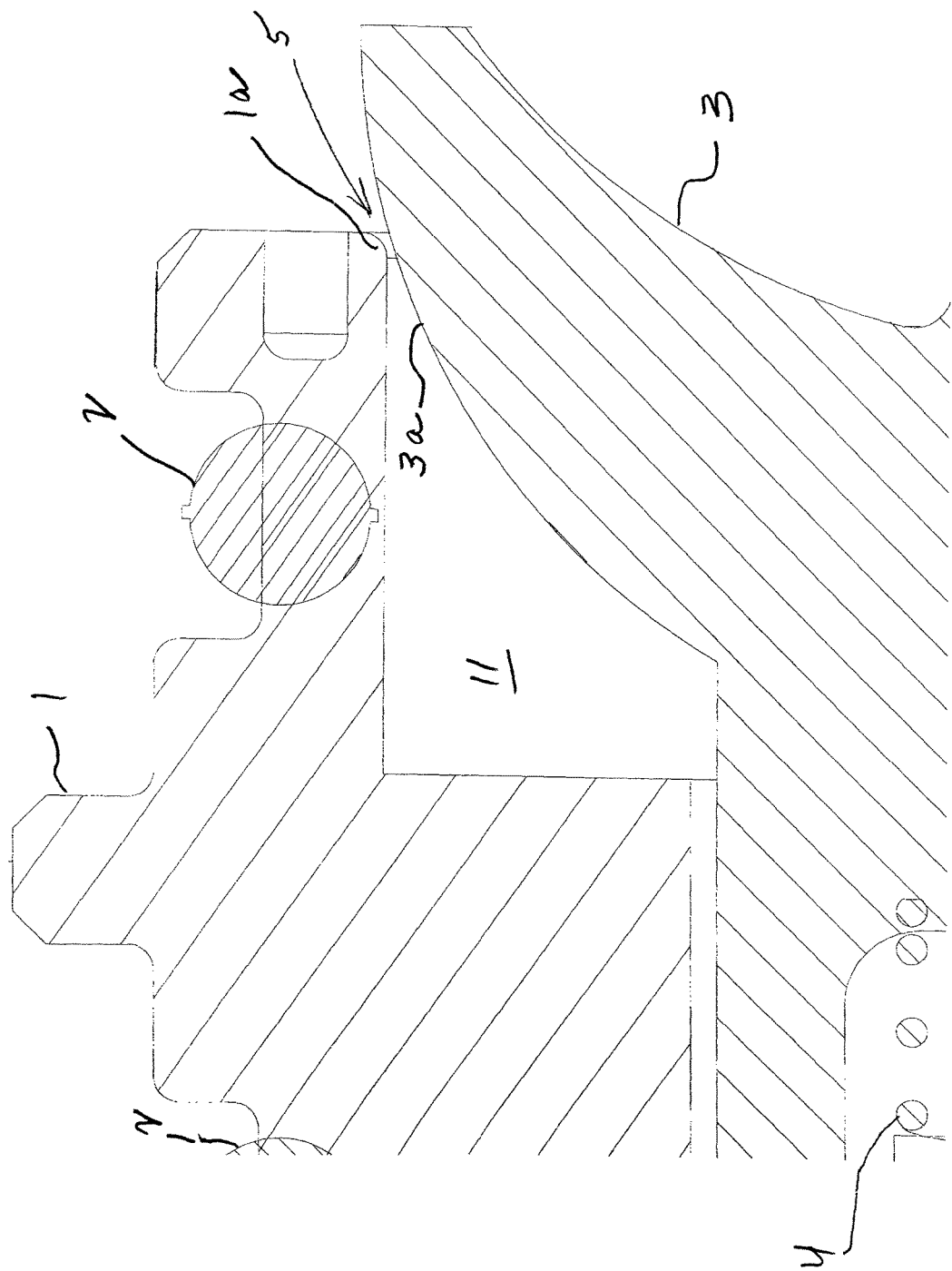
FIG. 4 is an enlarged partial cross-sectional view of a check valve having a seat and a poppet that shows a thin lip seal formed at the interface between the poppet and the seat.

FIG. 4 shows the thin lip seal 5 formed on the circumferential edge 1a of the seat 1 that is formed at the interface between the poppet 3 and the seat 1 and that enables the plastic to be softer and more pliable to seal against poppet 3. As shown, the lip seal 5 may also be radiused (aka curved) for the purpose of deburring. The thin plastic sealing lip may have a thickness of about 0.01", where the thickness is measured in terms of the sealing material of the circumferential edge 1a that forms the thin lip seal 5 and that physically contacts the outer circumferential surface 3a of the poppet 3.

FIGS. 5a-5c show testing data that supports the operability and viability of the present invention for a G57 prototype pump with 73 Shore A Kalrez diaphragm with PP check valve and Vitron. For example, FIG. 5a shows a graph of test data for a $1^{st}$ unit and a $2^{nd}$ unit having flow rate (GPM) versus discharge pressure (PSI) for 20 PSI. 40 PSI, . . . , 100 PSI for test data for the $1^{st}$ and $2^{nd}$ units shown in FIGS. 5b and 5c. In FIGS. 5a-5c, the scope is to: generate 5 curves @ gas pressure 20-100 PSI (20 PSI increments) flow rate from lowest to open flow in approximate 0.5 GPM increments.

Embodiments are also envisioned where the thickness of the lip seal 5 may be in a range of 0.003"-0.03".

Other features of the present invention include: the plastic material being made of polypropylene; the circumferential outer surface 3a being a curved surface and the thin sealing lip 5 for coupling in a sealing manner with the circumferential curved outer surface 3a of the poppet 3; the poppet 3 having a cavity 3b for receiving the elastic member 4; the elastic member 4 being configured between the seat 1 and the poppet 3 for urging the poppet 3 when no fluid flows in the one direction; and the check valve 10 having one or more O-rings 2 arranged on the outer surface of the seat for sealing the seat 1 in relation to another body or device (not shown) to prevent fluid from leaking.

SCOPE OF THE INVENTION

Accordingly, the invention comprises the features of construction, combination of elements, and arrangement of parts which will be exemplified in the construction hereinafter set forth.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

What is claimed is:

1. A check valve having a seat with an aperture formed therein for enabling fluid to flow through the seat, and also having a poppet with first and second ends, the poppet being arranged in the aperture of the seat, the poppet opening in response to fluid pressure in a first direction from a first end to a second end of the poppet so as to enable fluid to flow in the first direction, and the poppet closing in response to fluid pressure in a second direction so as not to enable fluid to flow in the second direction from the second end to the first end of the poppet, the check valve being made of perfluoroelastomer for providing high chemical resistance to chemicals like hydrocarbon solvents or ethylene glycol monobutyl ether,
wherein the improvement comprises:
the seat and the poppet being made of a polypropylene;
the seat having a curved circumferential edge with a thin sealing lip;
the poppet having a curved outer circumferential surface, the curved circumferential edge of the seat and the curved outer circumferential surface of the poppet being curved in the opposite directions in relation to one another; and
the thin sealing lip being formed on the curved circumferential edge of the seat at the interface between the seat and the poppet, physically contacting with the curved outer circumferential surface of the poppet in a sealing manner so as not to enable fluid to flow in the second direction in response to fluid pressure in the second direction, and having a thickness of about 0.01", the thickness being measured in terms of sealing material of the curved circumferential edge that forms the thin sealing lip and that physically contacts the curved outer circumferential surface of the poppet, where the use of the polypropylene allows for the thickness of about 0.01" for the thin sealing lip.

2. A pump for processing high chemical resistance to chemicals like hydrocarbon solvents or ethylene glycol monobutyl ether, the pump including a check valve having a seat with an aperture formed therein for enabling fluid to flow through the seat, and also having a poppet with first and second ends, the poppet being arranged in the aperture of the seat, the poppet opening in response to fluid pressure in a first direction from a first end to a second end of the poppet so as to enable fluid to flow in the first direction, and the poppet closing in response to fluid pressure in a second direction so as not to enable fluid to flow in the second direction from the second end to the first end of the poppet, the check valve being made of perfluoroelastomer for providing high chemical resistance to chemicals like hydrocarbon solvents or ethylene glycol monobutyl ether,
wherein the improvement comprises:
the seat and the poppet being made of a polypropylene;
the seat having a curved circumferential edge with a thin sealing lip;
the poppet having a curved outer circumferential surface, the curved circumferential edge of the seat and the curved outer circumferential surface of the poppet being curved in the opposite directions in relation to one another; and
the thin sealing lip being formed on the curved circumferential edge of the seat at an interface between the seat and the poppet, physically contacting with the curved outer circumferential surface of the poppet in a sealing manner so as not to enable fluid to flow in the second direction in response to fluid pressure in the second direction, and having a thickness of about 0.01", the thickness being measured in terms of sealing material of the curved circumferential edge that forms the thin sealing lip and that physically contacts the curved outer circumferential surface of the poppet, where the use of the polypropylene allows for the thickness of about 0.01" for the thin sealing lip.

* * * * *